United States Patent
Lyu et al.

(10) Patent No.: US 11,870,526 B2
(45) Date of Patent: Jan. 9, 2024

(54) WIRELESS COMMUNICATION METHOD AND APPARATUS, DEVICE, AND STORAGE MEDIUM

(71) Applicant: QUECTEL WIRELESS SOLUTIONS CO., LTD., Shanghai (CN)

(72) Inventors: Ling Lyu, Shanghai (CN); Zhongzhi Yang, Shanghai (CN); Penghe Qian, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/117,744

(22) Filed: Mar. 6, 2023

(65) Prior Publication Data

US 2023/0208491 A1    Jun. 29, 2023

Related U.S. Application Data

(63) Continuation of application No. PCT/CN2021/116971, filed on Sep. 7, 2021.

(30) Foreign Application Priority Data

Aug. 10, 2021    (CN) .......................... 202110911958.6

(51) Int. Cl.
*H04B 7/06* (2006.01)
*H04W 68/02* (2009.01)

(52) U.S. Cl.
CPC ......... *H04B 7/0626* (2013.01); *H04B 7/0617* (2013.01); *H04W 68/02* (2013.01)

(58) Field of Classification Search
CPC ... H04B 7/0626; H04B 7/0617; H04W 68/02; H04W 16/28; H04W 4/08; H04W 52/0212
See application file for complete search history.

(56) References Cited

U.S. PATENT DOCUMENTS

| | | | |
|---|---|---|---|
| 2019/0007844 A1 | 1/2019 | Müller et al. | |
| 2019/0380099 A1 | 12/2019 | Hakola et al. | |
| 2020/0178267 A1* | 6/2020 | Caretti | H04W 8/005 |
| 2021/0195521 A1 | 6/2021 | Müller et al. | |
| 2021/0321361 A1* | 10/2021 | Abedini | H04W 72/53 |

(Continued)

FOREIGN PATENT DOCUMENTS

| | | |
|---|---|---|
| CN | 102013905 | 4/2011 |
| CN | 107018496 | 8/2017 |

(Continued)

OTHER PUBLICATIONS

InterDigital, Inc., "Overhead reduction techniques for NR paging based on beam sweeping." 3GPP TSG RAN WG1 Meeting #91, R1-1720549, Reno, USA, Nov. 27-Dec. 1, 2017, 6 pages.

(Continued)

*Primary Examiner* — Fred A Casca
(74) *Attorney, Agent, or Firm* — Fish & Richardson P.C.

(57) ABSTRACT

The present application provides a wireless communication method and apparatus, a device, and a storage medium. One example method includes: performing, by a base station, user grouping management on all terminals in a target cell; periodically updating user groups for all terminals in the target cell; and initiating, based on the user groups, paging of different groups.

19 Claims, 7 Drawing Sheets

(56) References Cited

U.S. PATENT DOCUMENTS

| | | | | |
|---|---|---|---|---|
| 2021/0345141 A1* | 11/2021 | Cao | ............... | H04W 24/10 |
| 2021/0385814 A1* | 12/2021 | Abotabl | ............ | H04W 72/23 |
| 2022/0400043 A1* | 12/2022 | Lim | ............... | H04L 5/0037 |
| 2023/0108591 A1* | 4/2023 | Liao | ............... | H04B 7/0452 |
| | | | | 370/329 |
| 2023/0117493 A1* | 4/2023 | Li | ............... | H04W 24/10 |
| | | | | 370/329 |

FOREIGN PATENT DOCUMENTS

| | | |
|---|---|---|
| CN | 107295483 | 10/2017 |
| CN | 109151849 | 1/2019 |
| CN | 109391905 | 2/2019 |
| CN | 110169156 | 8/2019 |
| CN | 111108786 | 5/2020 |
| CN | 111466142 | 7/2020 |
| IN | 201947010837 | 3/2019 |
| WO | WO 2019006807 | 1/2019 |

OTHER PUBLICATIONS

Office Action in Chinese Appln. No. 202110911958.6, dated Apr. 19, 2022, 4 pages (with English translation).

Office Action in Chinese Appln. No. 202110911958.6, dated Mar. 23, 2022, 15 pages (with English translation).

PCT International Search Report and Written Opinion in International Appln. No. PCT/CN2021/116971, dated Mar. 29, 2022. 8 pages (with English translation).

Vivo, "Discussion on paging grouping" 3GPP TSG RAN WG1#103-e, R1-2007675, 26 Oct. 26-Nov. 13, 2020, 9 pages.

\* cited by examiner

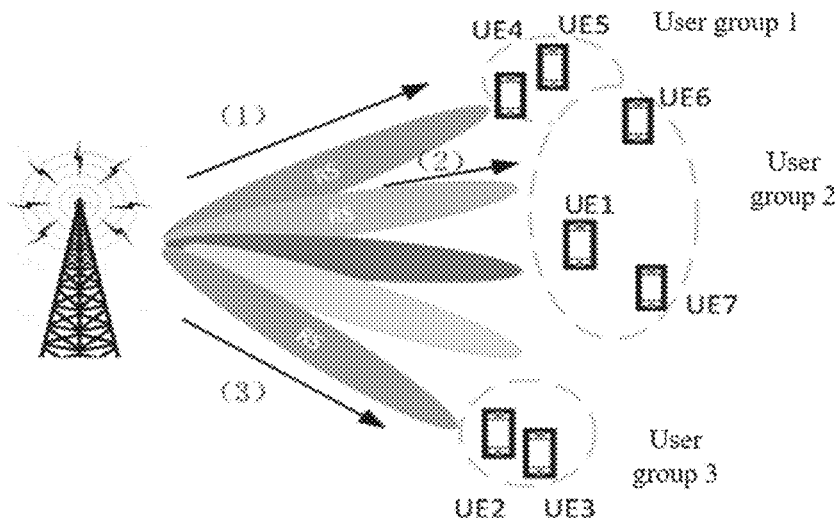

When the base station initiates paging to the target terminal, determining, based on the estimated beam corresponding to each terminal in the target cell at time (K+N) and the estimated user group in which each terminal is located, a target beam corresponding to the target terminal at time (K+N) and a target user group in which the target terminal is located, where the target terminal is a terminal that needs to be paged, and the target terminal is located in the target cell

2032

Sending paging information to the target user group through the target beam to page the target terminal

FIG. 9

WIRELESS COMMUNICATION METHOD AND APPARATUS, DEVICE, AND STORAGE MEDIUM

CROSS-REFERENCE TO RELATED APPLICATIONS

The present application is a continuation application of International Application No. PCT/CN2021/116971 filed on Sep. 7, 2021, which claims priority to Chinese patent application No. 202110911958.6 filed on Aug. 10, 2021. Both applications are incorporated herein by reference in their entireties.

TECHNICAL FIELD

The present application relates to the field of communication technologies, and specifically, to a wireless communication method and apparatus, a device, and a storage medium.

BACKGROUND

A fifth generation (5G) mobile standard calls for higher data transfer speeds, greater numbers of connections, better coverage, and other improvements. The 5G standard is designed to provide data rates of several tens of megabits per second to each of tens of thousands of users. In some wireless communication networks, such as 5G or subsequent technology evolution, an operation in very high band, even in extremely high frequency (EHF) band is supported. For example, an operation in millimeter-wave (mmW) frequency band is supported, typically with wavelength ranging from 1 mm to 10 mm, or frequency ranging from 30 to 300 GHz. An operation in these EHF bands may support very high throughput. However, in very high or EHF wireless communication, high frequency communication may cause significant propagation losses. In the mmW band, the propagation loss may be relatively large. In addition, in a large number of densely distributed antenna units, a terminal device is forced to perform beamforming in an analog domain, that is, a beam points to one direction at a particular time. Therefore, a base station often needs to implement transmission with a terminal device by sweeping a set of beams focused in different directions. However, the manner of sweeping a set of beams has high costs in terms of time, power consumption and air resources.

SUMMARY

Embodiments of the present application provide a wireless communication method and apparatus, a device, and a storage medium, which may shorten paging time, effectively reduce energy consumption, and save costs.

According to a first aspect, a wireless communication method is provided and applied to a base station. The method includes: performing user grouping management on all terminals in a target cell; periodically updating user groups for all terminals in the target cell; and initiating, based on the user groups, paging of different groups.

According to second aspect, a wireless communications apparatus is provided, and the apparatus includes: a grouping module, configured to perform user grouping management on all terminals in a target cell; an updating module, configured to periodically update user groups for all terminals in the target cell; and a paging module, configured to initiate, based on the user groups, paging of different groups.

In a third aspect, a network device is provided and includes a processor and a memory. The memory is configured to store a computer program, and the processor is configured to call and run the computer program stored in the memory to perform the wireless communication method according to the first aspect.

According to a fourth aspect, a chip is provided, and the chip includes a processor configured to call and run a computer program from a memory to cause a device installed with the chip to perform the wireless communication method according to the first aspect.

According to a fifth aspect, a computer-readable storage medium is provided. The computer-readable storage medium stores a computer program, and the computer program is adapted to be loaded by a processor to perform the wireless communication method according to the first aspect.

According to a sixth aspect, a computer program product is provided and includes computer program instructions. The computer program instructions cause a computer to perform the wireless communication method according to the first aspect.

According to a seventh aspect, a computer program is provided. When the computer program is run on a computer, the computer is enabled to perform the wireless communication method according to the first aspect.

Embodiments of the present application provide a wireless communication method and apparatus, a device, and a storage medium. A base station performs user grouping management on all terminals in a target cell, periodically updates user groups for all terminals in the target cell; and initiates, based on the user groups, paging of different groups. In the embodiments of the present application, paging grouping management is performed for all users in a cell managed by the base station, where each beam manages one user group; user groups is periodically updated for all terminals in the target cell; and then paging of different groups is initiated based on the user groups. Same paging is initiated only to a user group that is corresponding to a target beam, not to a user group managed by another beam. Therefore, paging time may be shortened, energy consumption may be reduced, and costs may be saved.

BRIEF DESCRIPTION OF THE DRAWINGS

To describe the technical solutions in the embodiments of the present application more clearly, the drawings required to describe the embodiments are briefly described below. Apparently, the drawings described below are only some embodiments of the present application. A person of ordinary skill in the art may further obtain other drawings based on these drawings without creative efforts.

FIG. 8 is a schematic diagram of a fourth scenario in which a base station performs group management on user groups according to an embodiment of the present application.

FIG. 9 is still another schematic flowchart of a wireless communication method according to an embodiment of the present application.

DETAILED DESCRIPTION OF THE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts fall within the protection scope of the present application.

Embodiments of the present application may be applied to various communications systems such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, an new radio (NR) system, an evolution system of an NR system, an LTE-based access to unlicensed spectrum (LTE-U) system, an NR-based access to unlicensed spectrum (NR-U) system, a universal mobile telecommunication system (UMTS), a wireless local area network (WLAN), wireless fidelity (Wi-Fi), a next generation communications system, or another communications system.

For example, a communications system not only supports conventional communication, but also supports, for example, device to device (D2D) communication, machine to machine (M2M) communication, machine type communication (MTC), and vehicle to vehicle (V2V) communication, and the embodiments of the present application may also be applied to these communications systems.

In some embodiments, a communications system in the embodiments of the present application may be applied to a carrier aggregation (CA) scenario, may be applied to a dual connectivity (DC) scenario, or may be applied to a stand-alone (SA) networking scenario.

Figure 1:
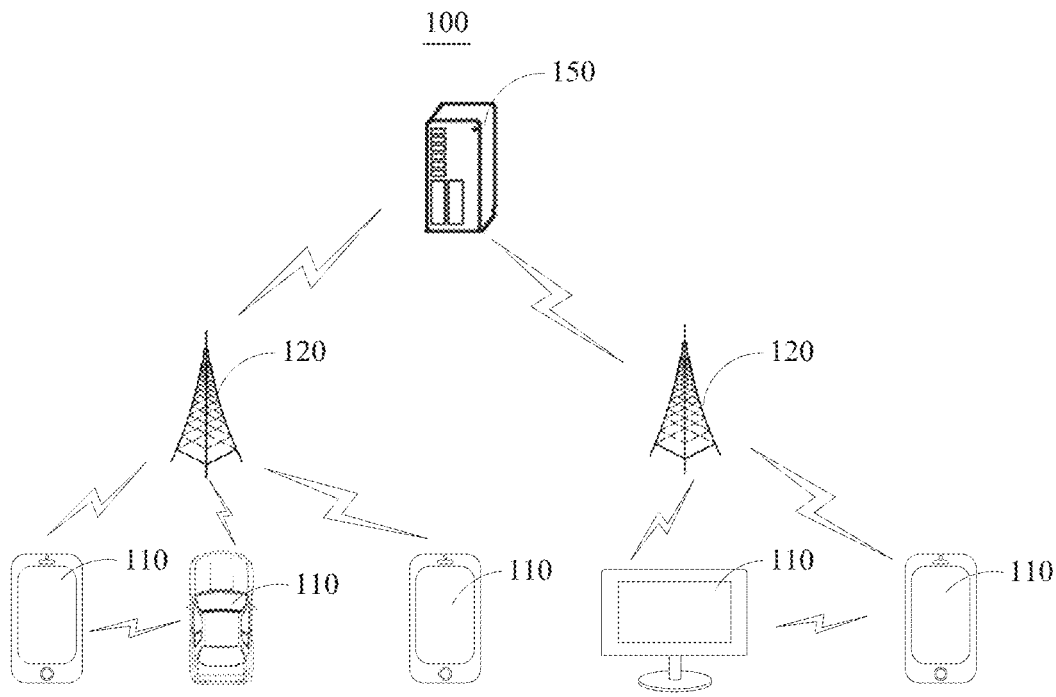
FIG. 1 is a schematic diagram of a structure of a communications system according to an embodiment of the present application.
Figure 2:
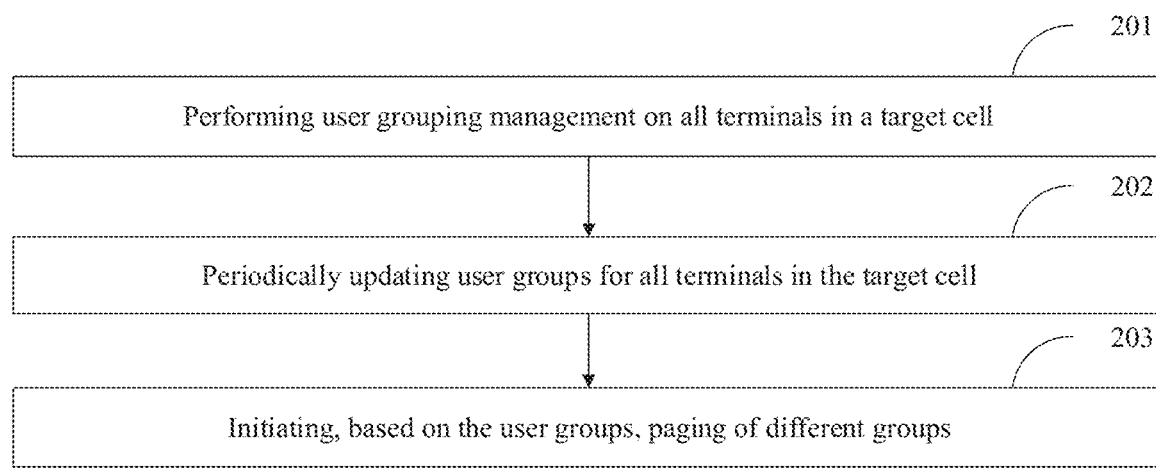
FIG. 2 is a schematic flowchart of a wireless communication method according to an embodiment of the present application.

Referring to FIG. 1, FIG. 1 is a schematic diagram of a structure of a communications system according to an embodiment of the present application. The communications system 100 may include a plurality of terminal devices 110 and a plurality of network devices 120. Network device 120 may provide communication coverage for a specific geographic area, and may communicate with a terminal device 110 located within the coverage area. FIG. 1 exemplarily shows three network devices and five terminal devices, and the communications system may include a plurality of network devices and another number of terminal devices may be included within a coverage area of each network device, which is not limited by the embodiment of the present application.

The terminal device 110 may also be referred to as a user equipment (UE), an access terminal, a user unit, a user station, a mobile station, a distant station, a remote terminal, a mobile device, a user terminal, a terminal, a wireless communication device, a user proxy, a user apparatus, or the like. The terminal device 110 may be a station (ST) in a WLAN, or may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system such as an NR network or a future evolved public land mobile network (PLMN), or the like.

As an example, rather than limitation, the terminal device 110 may alternatively be a wearable device. The wearable device may also be referred to as an intelligent wearable device, and is a general term of wearable devices such as glasses, gloves, watches, clothes, and shoes intelligently designed and developed based on daily wearing by using a wearable technology. Alternatively, the terminal device 110 may be an unmanned aerial vehicle device. Alternatively, the terminal device 110 may be a vehicle-mounted device, for example, may be an on-board computer having a wireless communication function, or a wireless user equipment externally connected to an on-board computer. Alternatively, the terminal device 110 may be a roadside device, for example, a street lamp, a signal light, or another roadside device having a wireless communication function.

The network device 120 may be a device for communicating with a mobile device. The network device 120 may be an access point (AP) in a WLAN, or a base transceiver station (BTS) in GSM or CDMA, may be a NodeB (NB) in WCDMA, or may be an evolved NodeB (eNB or eNodeB) in LTE, a relay station or an access point, a vehicle-mounted device, a wearable device, a network device or a base station (gNB) in an NR network, or a network device in a future evolved PLMN network, or the like.

In the embodiment of the present application, the network device 120 provides a service for a cell, and the terminal device 110 communicates with the network device 120 through a transmission resource (such as a frequency domain resource or a frequency spectrum resource) used by the cell. The cell may be a cell corresponding to the network device 120 (for example, a base station), and the cell may belong to a macro base station or a base station corresponding to a small cell. The small cell herein may include a metro cell, a micro cell, a pico cell, a femto cell, and the like. The small cell has characteristics of small coverage and low transmit power, and is suitable for providing a high-rate data transmission service.

A wireless connection may be established between the network device 120 and the terminal device 110 through a wireless air interface.

For example, an end to end (E2E) connection may also be established between the terminal devices 110.

In some embodiments, the communications system may further include a network management device 150. A plurality of network devices 120 (base stations) are each connected to the network management device 130. The network management device 130 may be a core network device in a wireless communications system. For example, the network management device 130 may be a mobility management entity (MME) in an evolved packet core (EPC). Alternatively, the network management device may be another core network device, such as a 5G core network, a serving gateway (SGW), a public data network gateway (PGW), a policy and charging rules function (PCRF), or a home subscriber server (HSS). An implementation form of the network management device 130 is not limited in the embodiment of the present application.

In the embodiment of the present application, user grouping management is performed for all terminals (terminal device 110) in a target cell of a base station (network device 120), user groups is periodically updated for all terminals in the target cell, and paging of different groups is initiated based on the user groups. In the embodiment of the present application, paging grouping management is performed for all users in a cell managed by a base station, where each beam manages one user group; user groups is periodically updated for all terminals in the target cell; and then paging of different groups is initiated based on the user groups. Same paging is initiated only to a user group that is corresponding to a target beam, not to a user group managed by another beam. Therefore, paging time may be shortened, energy consumption may be reduced, and costs may be saved.

In some embodiments, when initial beams are established between the base station (network device 120) and all terminals (terminal device 110) in the target cell, the based station determines, based on an initial beam corresponding to each terminal in the target cell, an initial user group in which each terminal in the target cell is located; when an interval time N reaches a time threshold, the base station receives channel state information CSI reports reported by all terminals in the target cell; the base station predicts, based on the CSI report, an estimated beam corresponding to each terminal in the target cell at time (K+N) and an estimated user group in which each terminal is located; when initiating paging to the target terminal, the base station determines, based on the estimated beam corresponding to each terminal in the target cell at time (K+N) and the estimated user group in which each terminal is located, a target beam corresponding to the target terminal at time (K+N) and a target user group in which the target terminal is located, where the target terminal is a terminal that needs to be paged, and the target terminal is located in the target cell; and the base station sends paging information to the target user group through the target beam to page the target terminal. In the embodiment of the present application, paging grouping management is performed on all users in a cell managed by a base station. Each beam manages one user group. An initial user group in which each terminal is located is a user group managed by an initial beam of each terminal. When an interval time reaches a time threshold, the strongest beam corresponding to each terminal in a target cell at time (K+N) is re-predicted as an estimated beam based on CSI reports reported by all terminals, and an estimated user group in which each terminal is located is predicted. When initiating paging to a target terminal, the base station determines, based on the estimated beam and the estimated user group, a target beam of a UE of a target terminal to be paged at time (K+N) and a target user group in which the target terminal is located, and paging is initiated only to a target user group managed by the target beam corresponding to the target terminal, not to a user managed by another beam. Therefore, paging time may be shortened, energy consumption may be reduced, and costs may be saved.

Referring to FIG. 2 to FIG. 11, FIG. 2, FIG. 5, FIG. 9, and FIG. 11 are schematic flowcharts of a wireless communication method according to an embodiment of the present application, and FIG. 3, FIG. 4, FIG. 6, FIG. 8, and FIG. 10 are schematic diagrams of application scenarios according to an embodiment of the present application. The method is applied to a base station, and includes:

Step 201: performing user grouping management on all terminals in a target cell.

In some embodiments, the performing user grouping management on all terminals in a target cell includes: when initial beams are established between a base station and all terminals in the target cell, determining, based on an initial beam corresponding to each terminal in the target cell, an initial user group in which each terminal in the target cell is located.

The target cell is a cell managed by the base station. For example, the target cell may be a new radio (NR) cell. For a primary synchronization signal (PSS) and a secondary synchronization signal (SSS) of the NR cell and a time-frequency resource (Synchronization Signal Block, SSB) composed of a physical broadcast channel (PBCH), synchronization signal burst sets (SS burst sets) corresponding to different frequency bands use different upper limits of a quantity of SSBs. The SS burst sets are repeated in time domain in a predetermined direction (beam) within the 5 ms window, and a period of each SS burst set is 20 ms.

Figure 3:
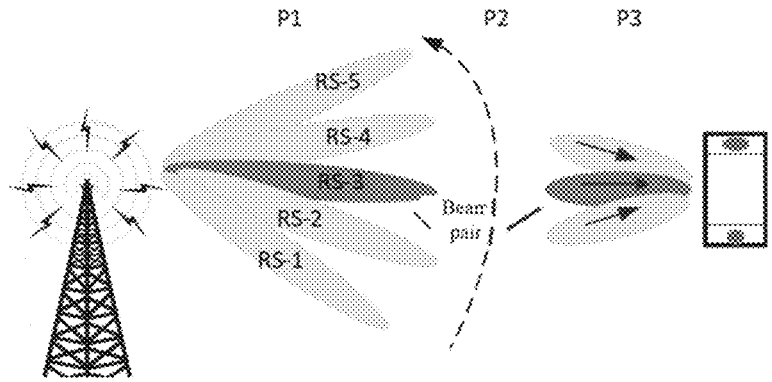
FIG. 3 is a schematic diagram of a scenario in which an initial beam is established according to an embodiment of the present application.

For example, in the schematic diagram of a scenario in which an initial beam is established shown in FIG. 3, it is assumed that one SS burst set includes five SSBs numbered RS-1 to RS-5. In an NR cell (target cell), the SSBs are sent in a beam sweeping manner, and each SSB beam has a different direction in space. In a phase that a UE searches for a cell, the UE measures all SSBs in an SS burst set and finds are SSB having the strongest signal, which corresponds to a P1 process (initial beam selection) shown in FIG. 3. A beam (BEAM) optimization is then performed in a P2 process (transmit beam change) to find a beam, narrower than a beam of the SSB, for transmitting a physical downlink shared channel (PDSCH)/physical downlink control channel (PDCCH). A P3 process is used in an FR2 band, and the UE also has a beamforming capability. When an initial beam is established between the base station and the LTE, a plurality of optimized beams transmitted by the base station in a time corresponding to one SSB use same CSI reference signal resources, and the UE attempts to perform receiving by using different beams. On the one hand, the SSB is associated with a downlink beam; and on the other hand, the SSB is also associated with resources such as an uplink random access opportunity and a preamble. In this way, the base station may learn, through random access, a downlink beam selected by the UE. Since a beam can only point to one direction at a specific time, downlink data transmitted to UEs that are in different directions needs to be arranged at different times for transmission, respectively, and a receive beam can perform receiving only in one direction at a specific time, so that an initial beam pair is established between the base station and the UE. In addition, each beam corresponds to one demodulation reference signal (DMRS) port/port group, one transmission configuration index (TCI), one transmit-receive point (TRP), or one SRS resource indicator (SRI), where the SRI is used for uplink data transmission. For example, different beams may also be represented by different DMRS port/port groups, TCIs, TRPs, or SRIs. When an initial beam pair is established, in a subsequent communication process, a UE assumes that a same spatial filter is always used during downlink transmissions of a network, that is, it is assumed that a transmit beam used by the SSB is kept in the network. Thus, the UE considers that the best receive beam received is used during subsequent downlink transmissions. Frequency ranges of 5G NR are respectively defined as FR1 and FR2. The frequency range FR1 generally represents a 5G Sub-6 GHz (below 6 GHz) band, and the frequency range FR2 generally represents a 5G millimeter-wave frequency band. BeamForming is a technique for constructing an antenna radiation pattern.

For example, an initial access phase is initiated whenever a terminal is present in the range of a target cell managed by the base station. For example, when the base station and a terminal A appearing in a target cell are connected to establish an initial beam process, the base station sends a plurality of SSBs to synchronize signals and cell information through beam sweeping. These SSBs are sequentially sent and each SSB is carried on a different downlink beam. On the one hand, the SSBs are associated with downlink beams; and on the other hand, the SSBs are also associated with resources such as an uplink random access opportunity and a preamble. When the terminal A appears in the range of the target cell managed by the base station, the initial access phase is started. The terminal A initiates a random access request, and selects a specific downlink beam (initial beam) for beam matching and binding according to a plurality of SSBs sent by the base station. In this way, the base station may learn, through random access, the downlink beam selected by the terminal. Since a beam can only point to one direction at a specific time, downlink data transmitted to terminals that are in different directions needs to be arranged at different times for transmission, respectively, and a receive beam can perform receiving only in one direction at a specific time, so that an initial beam pair is established between the base station and the terminal A. The downlink beam determined by the terminal A is used as an initial beam A, and then the terminal A is assigned to management of the initial beam A and subscribed to a user group of the initial beam A, becoming a member of the user group. Initial beams are established between all terminals in the target cell and the base station to determine, based on an initial beam corresponding to each terminal in the target cell, an initial user group in which each terminal in the target cell is located.

Figure 4:
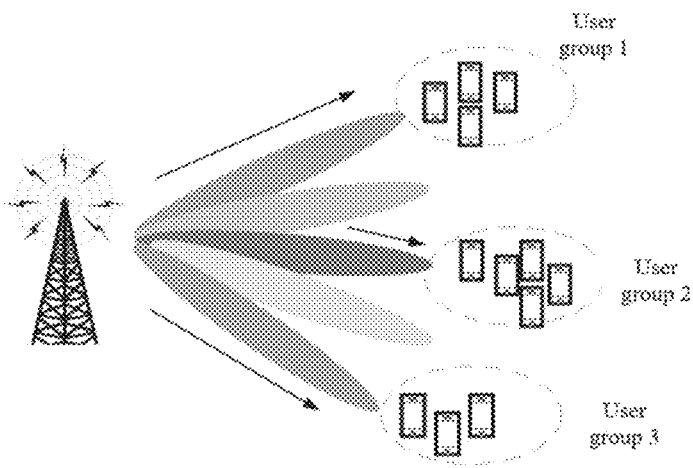
FIG. 4 is a schematic diagram of a first scenario in which a base station performs group management on user groups according to an embodiment of the present application.

In a schematic diagram of a scenario in which a base station performs group management on user groups shown in FIG. 4, paging grouping management is performed for all users in a cell managed by a 5G base station (gNB). The grouping is performed according to each beam managing one user group during downlink transmission of the base station.

When a connection is established between UEs and the base station, ID information (IMSI, TMSI, and the like) of all UEs in the target cell is stored in the base station. When initial beams are established between the UEs and the base station, the base station learns a specific beam under which a UE receives a signal, that is, UEs receiving the signal under the specific beam belong to a same user group. However, for reasons of mobility, rotatability, and the like of the UEs, whether receive end beams and transmit end beams are suitable needs to be re-evaluated periodically. Even if the UEs are completely stationary, movement of some objects in surrounding environment may block a beam or some objects no longer block some beam pairs, which means that the beam has to be adjusted to reduce a probability of paging failure. In this way, optimal quality of service may be achieved.

Step 202: Periodically updating user groups for all terminals in the target cell.

In some embodiments, the periodically updating user groups for all terminals in the target cell includes: receiving, when an interval time N reaches a time threshold, channel state information CSI reports reported by all terminals in the target cell; predicting, based on the CSI report, an estimated beam corresponding to each terminal in the target cell at time (K+N); and determining, based on the estimated beam, an estimated user group in which each terminal is located.

Figure 5:
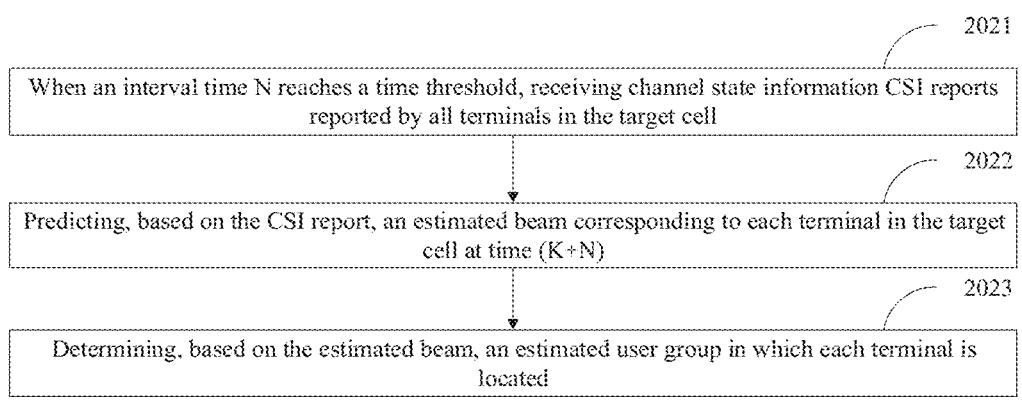
FIG. 5 is another schematic flowchart of a wireless communication method according to an embodiment of the present application.

As shown in FIG. 5, Step 202 may be specifically implemented by Step 2021 to Step 2023 as follows.

Step 2021: When an interval time N reaches a time threshold, receiving channel state information CSI reports reported by all terminals in the target cell.

When the UE attempts to receive signals from different beams of the base station by using a determined receive beam (such as an initial beam), the base station sets a channel state information (CSI) reporting frame and sets a quantity of reports to "cri-RSRP". Channel state information acquisition (CSI acquisition) information includes reference signal received power (RSRP), reference signal received quality (RSRQ), channel-quality indicator (CQI), rank indicator (RI), precoding-matrix indicator (PMI), signal-to-interference-plus-noise ratio (SINR), and the like. When the UE attempts to receive signals from different beams of the base station by using the determined receive beam, the UE generates a CSI report. The CSI report may include a CSI reference signal resource indicator (CSI-RS Resource Indicator, CRI) for indicating the strongest CSI reference signal, that is, indicating that the UE identifies and reports the best downlink beam. For example, the CSI report may further include layer 1 reference signal received power (L1-RSRP) measured from the strongest CSI reference signal. For the FR2 band, in this case, the UE may use one or more antenna panels to provide a beamforming capability. The CSI reference signal is repeated to be used to generate a plurality of transmissions of a same CSI reference signal beam. The UE evaluates an optimal receive beam by measuring these repeated CSI reference signals, that is, when the base station sends the repeated CSI reference signals, the UE simultaneously completes its own beam sweeping. That is, during transmission performed by the LTE, the UE finds a beam direction by evaluating quality of the CSI reference signals of a plurality of beams from the base station, and the UE evaluates quality of a CSI reference signal from each of the plurality of beams and selects an optimal beam. The CSI reference signals are transmitted in a time-multiplexed manner.

For example, the base station may instruct all UEs in the target cell to report strengths of M CSI reference signals. M is less than a total number N of beams. A reference signal set of different beams to be measured is defined by a non-zero-power channel state information reference signal (non-zero-power CSI reference signal, NZP-CSI-RS) resource group in report configuration. The NZP-CSI-RS resource group includes a set of configured channel state information reference signals (CSI-RS) or SSBs, and a quantity of resource groups is related to a UE capability. The BeamManagementSSB-CSI-RS parameter set (belonging to MIMO-ParametersPerBand UE capability information) indicates the UE capability according to a quantity of reference signals supported by beam management. For example, 3G-PP TS 38.306 defines that a UE needs to support at least 8 CSI reference signal resources when using an operating frequency band of FR1. That is, the UE needs to perform measurement and reporting on the M reference signals separately.

The base station needs to set a reporting manner of the CSI report, and the CSI report may be reported in a manner of periodic reporting or trigger reporting. The base station reaches agreement with a target terminal at the beginning.

In some embodiments, when an interval time reaches a time threshold, the CSI reports reported by all terminals in the target cell based on a first reporting instruction are received. The first reporting instruction is an instruction sent by the base station to each terminal in the target cell during establishment of initial beams between the base station and all terminals in the target cell, and the first reporting instruction is used to instruct each terminal in the target cell to automatically report the CSI report when the interval time reaches the time threshold.

For example, corresponding to the manner of periodic reporting, when initial beams are established between a base station and all terminals in a target cell, the base station sends a first reporting instruction to each terminal in the target cell; the first reporting instruction carries time threshold information for indicating that all terminals in the target cell automatically monitor an interval time; and when each terminal in the target cell monitors that the interval time reaches a time threshold, each terminal in the target cell automatically reports a CSI report.

In some embodiments, when the interval time reaches a time threshold, a second reporting instruction is sent to all terminals in the target cell, and the CSI reports reported by all terminals in the target cell based on the second reporting instruction are received.

For example, corresponding to the manner of trigger reporting, when an interval time reaches a time threshold, a base station sends a second reporting instruction to all terminals in a target cell; the second reporting instruction is used for instructing all terminals in the target cell to report a CSI report; and when each terminal in the target cell receives the second reporting instruction, each terminal in the target cell is triggered to report the CSI report immediately.

In some embodiments, before Step 2021, the method further includes setting the interval time N. The set interval time N is used to represent an interval time from establishment of an initial beam to a current time.

In some embodiments, the time threshold includes at least one of the following: a time-frequency resource SSB, a period of a synchronization signal burst set SS burst set and a multiple of the period of the SS burst set.

Step 2022: Predicting, based on the CSI report, an estimated beam corresponding to each terminal in the target cell at time (K+N).

In some embodiments, the CSI report includes CSI reference signals of ISI beams corresponding to each terminal in the target cell, a layer 1 reference signal received power L1-RSRP of the strongest beam determined by each terminal in the target cell, and a difference between a reference signal received power of a remaining (M−1) beam and the L1-RSRP of the strongest beam of each terminal in the target cell.

For example, a CSI report reported by a UE1 includes a CSI reference signal corresponding to M beams that match the UE1 itself, a layer 1 reference signal received power L1-RSRP of the strongest beam determined by the UE1, and a difference between a reference signal received power of a remaining (M−1) beam and the L1-RSRP of the strongest beam of the UE1. A CSI report corresponding to a UE 2 includes a CSI reference signal corresponding to M beams that match the UE 2 itself, a layer 1 reference signal received power L1-RSRP of the strongest beam determined by the UE 2, and a difference between a reference signal received power of a remaining (M−1) beam and the L1-RSRP of the strongest beam of the UE 2.

In some embodiments the predicting, based on the CSI report, an estimated beam corresponding to each terminal in the target cell at time (K+N) includes: determining, based on the CSI report, RSRP values of the M beams corresponding to each terminal in the target cell at time K and time (K−1); calculating, based on the RSRP values of the M beams corresponding to each terminal in the target cell at time K and time (K−1), RSRP values of the M beams corresponding to each terminal in the target cell at time (K+N); and determining a beam corresponding to a maximum value of the RSRP values of the M beams corresponding to each terminal in the target cell at time (K+N) as an estimated beam corresponding to each terminal in the target cell at time (K+N).

In some embodiments, after the determining, based on the CSI report, RSRP values of the M beams corresponding to each terminal in the target cell at time K and time (K−1), the method further includes: storing the RSRP values of the M beams corresponding to each terminal in the target cell at time K and time (K−1) in a register. The calculating, based on the RSRP values of the M beams corresponding to each terminal in the target cell at time K and time (K−1), RSRP values of the M beams corresponding to each terminal in the target cell at time (K+N) includes: calculating, based on the RSRP values of the M beams corresponding to each terminal in the target cell at time K and time (K−1) stored in the register, the RSRP values of the M beams corresponding to each terminal in the target cell at time (K+N), where the time K and time (K−1) are two times, in all times stored in the register, closest to the time (K+N).

In some embodiments, the determining, based on the CSI report. RSRP values of the M beams corresponding to each terminal in the target cell at time K and time (K−1) includes: determining the RSRP values of the M beams corresponding to each terminal in the target cell at time K and time (K−1) based on the CSI reference signal of the M beams corresponding to each terminal in the target cell, the layer 1 reference signal received power L1-RSRP of the strongest beam determined by each terminal in the target cell, and the difference between the reference signal received power of the remaining (M−1) beam and the L1-RSRP of the strongest beam of each terminal in the target cell.

For example, the base station instructs all UEs to report reference signals corresponding to M CSI beams measured by the respective UE and the L1-RSRP of the strongest beam determined by the respective UE. For measurement of the remaining (M−1) beam, a difference between RSRP of the remaining beam and L1-RSRP of the strongest beam is reported, and the reported measurement data may be reported through the CSI report. For example, the base station receives L1-RSRP of the strongest beam reported by each UE on the determined beam at time K, and the difference between the RSRP of the remaining (M−1) beam and the L1-RSRP of the strongest beam, and determines that an intensity of the M beams is $RSRP_i$ based on the L1-RSRP of the strongest beam reported by each UE and the difference between the RSRP of the remaining (M−1) beam and the L1-RSRP of the strongest beam. The intensity of the determined M beams is $RSRP_i$, which may include beam intensities at a plurality of times.

The base station may set a register for storing the intensity of the M beams reported by all terminal devices UE_ID at time K and a time that is before time K (for example, time (K−1) as $RSRP_i$, where i=0, 1, 2, ..., M−1 and the base station has L downlink beams, and UEs managed by each beam form a group, and therefore there are L user groups, where M>0, and M is an integer. However, for reasons of mobility, rotatability, and the like of the UEs, suitability of receive end beams is re-evaluated periodically. Even if the UEs are completely stationary, movement of some objects in surrounding environment may block a beam or some objects no longer block some beam pairs, which means that the beam has to be adjusted to reduce a probability of paging failure. In this way, optimal quality of service may be achieved.

At time (K+N) for delivering paging, the base station (BS) needs to readjust a beam used to deliver the paging, where N denotes an interval time, and N is at least one SSB, or may be a period of an SS burst set, or a multiple of the period of the SS burst set. N represents an interval time from establishment of an initial beam to a current time.

In some embodiments, the calculating, based on the RSRP values of the M beams corresponding to each terminal in the target cell at time K and time (K−1), RSRP values of the M beams corresponding to each terminal in the target cell at time (K+N) includes: calculating a difference between an RSRP value of an $i^{th}$ beam corresponding to each terminal in the target cell at time K and an RSRP value of the $i^{th}$ beam at time (K−1); multiplying the interval time N by the difference to obtain a first calculation result; determining, based on a sum of the RSRP value of the beam at time K and the first calculation result, an RSRP value of the beam corresponding to each terminal in the target cell at time (K+N); and determining, based on the RSRP value of the $i^{th}$ beam corresponding to each terminal in the target cell at time (K+N), the RSRP values of the M beams corresponding to each terminal in the target cell at time (K+N), where i=0, 1, 2, ..., M−1.

At time K and time (K−1), the base station stores, based on the register, the RSRP values, received at time K and time (K−1), of the M beams reported by all UEs, and the base station estimates, based on the RSRP values of the M beams corresponding to all UEs at time K and the time (K−1), the RSRP values of the M beams corresponding to each UE in the target cell at time (K+N), which may be expressed as the following formula (1):

$$RSRP_i(K+N)=RSRP_i(K)+N*[RSRP_i(K)-RSRP_i(K-1)] \quad (1),$$

where N denotes an interval time; i denotes a beam number, where i=0, 1, 2, ..., M−1; $RSRP_i(K+N)$ denotes an RSRP value of an ith beam at time (K+N); $RSRP_i(K)$ denotes an RSRP value of the ith beam at time K; $RSRP_i(K−1)$ denotes an RSRP value of the ith beam at time (K−1); and $RSRP_i(K+N)$ denotes an RSRP value of an $i^{th}$ beam at time (K+N). The square brackets [ ] denote a rounding function.

During estimation of the RSRP values of the M beams corresponding to each UE in the target cell at time (K+N), the RSRP values of the M beams corresponding to each UE at time K and time (K−1) and the foregoing formula (1) may be used to traverse and calculate the RSRP value of the $i^{th}$ beam corresponding to each UE at time (K+N).

The time K and time (K−1) are two times, in all times stored in the register, closest to the time (K+N), where the time K is closest to time (K+N), the time (K−1) is a time before the time K, and the time K is between the time (K−1) and the time (K+N).

For an estimated beam that is currently calculated and corresponding to a UE at time (K+N), a sequence of RSRP values of the M beams corresponding to the UE is $[RSRP_i(K−N)]_{i=0, 1, 2 ... M}$, a maximum value max $|RSRP_i(K+N)|$ in the sequence is the highest beam intensity reported by the UE at time (K+N), and the beam corresponding to the maximum value max $|RSRP_i(K+N)|$ in the sequence is determined as the estimated beam of the UE. If the base station needs to initiate paging of the UE, the base station sends paging on the estimated beam corresponding to the UE. In other words, the base station predicts that the UE will be in a user group covered by the estimated beam at time (K+N), and may also learn a location of the UE; and the predicted UE location may then be used to directionally transmit paging information to the UE.

Step 2023: Determining, based on the estimated beam, an estimated user group in which each terminal is located.

In some embodiments, the determining, based on the estimated beam, an estimated user group in which each terminal is located includes: determining a user group managed by the estimated beam corresponding to each terminal in the target cell at time (K+N) as an estimated user group in which each terminal in the target cell is located at time (K+N).

Step 203: Initiating, based on the user groups, paging of different groups.

In some embodiments, the initiating, based on the user groups, paging of different groups includes: sending, via the estimated beam corresponding to each terminal, paging information to the estimated user group in which each terminal is located, to initiate paging of different groups.

Figure 6:
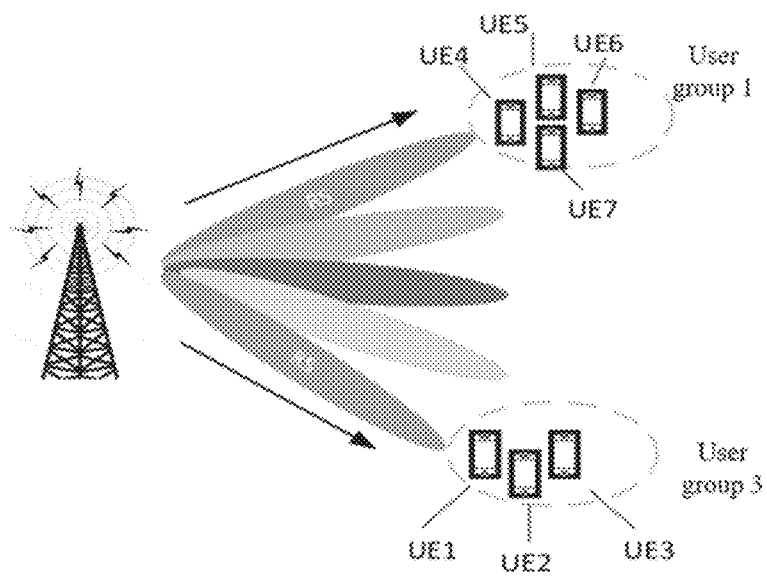
FIG. 6 is a schematic diagram of a second scenario in which a base station performs group management on user groups according to an embodiment of the present application.

For example, as shown in FIG. 6, during establishment of the initial beams, it is determined that the cell has two user groups: a user group 1 and a user group 3. The user group 1 includes UE 4, UE 5, UE 6 and UE 7 and the user group 3 includes UE 1, UE 2 and UE 3.

Figure 7:
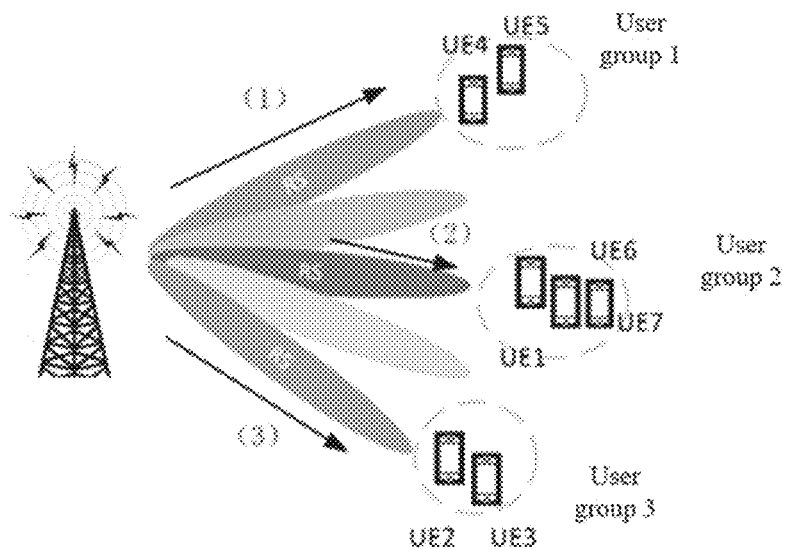
FIG. 7 is a schematic diagram of a third scenario in which a base station performs group management on user groups according to an embodiment of the present application.

In a given time, in particular, when UE RRC is in an inactive state, the base station and the UEs do not need to perform beam re-pairing or a beam re-establishment procedure. When an interval time N reaches a time threshold, the base station may predict, based on the method, a specific user group in which a UE is located at time (K+N) and initiate paging. In FIG. 7 or FIG. 8, the user groups corresponding to UE 1, UE 6, and UE 7 are changed, a user group 2 is added, and UE 1, UE 6, and UE 7 are adjusted from the original user group 3 and the user group 1 to the user group 2. An adjustment time of a beam may be calculated based on a period of an SSB set, where (1) denotes a beam for initiating paging to the user group 1; (2) denotes a beam for initiating paging to the user group 2; and (3) denotes a beam for initiating paging to the user group 3.

As shown in FIG. 7 or FIG. 8, paging grouping management is performed for all users in a cell managed by a 5G base station. The grouping is performed according to each beam managing one user group during downlink transmission of the base station. When the base station initiates paging, the paging is only initiated to a user group managed by a corresponding beam, not to a user managed by another beam.

In some embodiments, when the base station initiates paging of a target terminal, a target beam corresponding to the target terminal at time (K+N) and a target user group in which the target terminal is located are determined based on the estimated beam corresponding to each terminal in the target cell at time (K+N) and the estimated user group in which each terminal is located, where the target terminal is a terminal that needs to be paged, and the target terminal is located in the target cell; and paging information is sent to the target user group through the target beam to page the target terminal.

In some embodiment, as shown in FIG. 9, Step 203 may be specifically implemented by Step 2031 and Step 2032 as follows.

Step 2031: When the base station initiates paging to the target terminal, determining, based on the estimated beam corresponding to each terminal in the target cell at time (K+N) and the estimated user group in which each terminal is located, a target beam corresponding to the target terminal at time (K+N) and a target user group in which the target terminal is located, where the target terminal is a terminal to be paged, and the target terminal is located in the target cell.

When a core network wants to send a downlink message or data, a paging manner needs to be used to make UE return to a connected mode (RRC_CONNECTED) state. A paging message belongs to paging information that is transmitted based on that a UE paged by the core network can correctly receive a scheduled physical downlink control channel (PDCCH).

When a network needs to page a target terminal, a core network node (such as a mobility management entity (MME)) serving a terminal may initiate a paging procedure to all access network nodes (such as base stations eNB and eNodeB) in a tracking area. In this case, the access network nodes may receive a paging message sent by the core network node. The paging message is used to page the target terminal. The paging message may carry a target UE identity (UE_ID) of a target terminal that needs to be paged, and the target UE identity of the target terminal may include a terminal identity index value and an international mobile subscriber identity (IMSI) of the target terminal; or a terminal identity index value and an S-temporary mobile subscriber identity (S-TMSI) of the target terminal that needs to be paged; or a temporary mobile subscriber identity (TMSI) that needs to be paged.

In some embodiments, Step 2031 may include: when receiving a paging message transmitted by a 5G core network, determining, based on a target UE identity, carried in the paging message, of a target terminal that needs to be paged, a terminal corresponding to the target UE identity in all terminals in the target cell as the target terminal; and determining, based on an estimated beam corresponding to the determined target terminal at time (K+N), the target beam corresponding to the target terminal at time (K+N), and determining, based on an estimated user group in which the determined target terminal is located at time (K+N), a target user group in which the target terminal is located.

Step 2032: Sending paging information to the target user group through the target beam to page the target terminal.

For example, the paging message may carry a target UE identity (UE_ID) of the target terminal that needs to be paged, and the target UE identity of the target terminal may include an IMI, arm S-TMSI or a TMSI.

When the base station initiates paging of the target terminal, the paging is only initiated to a user group managed by a target beam corresponding to the target terminal, not to a user managed by another beam. According to this method, the paging information may be transmitted in a directional manner rather than by sweeping a beam set, thereby saving time and air resources, and reducing power consumption. From the perspective of an entire cell, paging grouping management of UEs is also dynamic, that is, a UE is not always in a specific user group after entering the cell, but dynamically changes its position depending on different beams used by the base station to transmit signals.

In some embodiment, the paging information is sent to all terminals belonging to the target user group through the target beam to page the target terminal, and the target terminal belongs to the target user group.

When a UE in the target user group monitors that a specific PI-RNTI indication is carried in a paging message DCI, demodulation is started, and a corresponding PDCCH and/or PDSCH is decoded to extract its own paging message.

In some embodiments, when the interval time N does not reach the time threshold, the paging information is sent to an initial user group corresponding to the target terminal through the initial beam to page the target terminal.

For example, when the interval time N does not reach the time threshold, the base station still considers by default that the initial beam sent to the target terminal remains unchanged, and the initial user group in which the target terminal is located also remains unchanged. Therefore, when the interval time N does not reach the time threshold, the paging information is sent to the initial user group corresponding to the target terminal through the initial beam corresponding to the target terminal to page the target terminal.

For example, the base station may transmit 32 SSBs and periodically scan different predefined directions (beams). The SSBs can cover only one predefined direction in a specific synchronization signal (SS) burst interval, and cover another predefined direction in a next SS burst interval. A maximum number of predefined directions (beams/SSBs) in the SS burst set is related to frequency, such as 4 beams for 3 GHz, 8 beams for 3-6 GHz, and 64 beams for 6-52.6 GHz.

According to the method provided in the embodiment of the present application, when the UE enters an RRC connected mode, the beam optimization process may be started. The beam optimization process may be used to select a beam with larger directivity and higher gain. More directional beams may improve link budget, but more frequent switching between beams is also required.

In addition, beam information may be indicated by a quasi co-location (QCL) relationship between antenna ports. Specifically, indication information may indicate that a resource (or antenna port) and another resource (or antenna port) are quasi co-located, so as to indicate that beams corresponding to the two resources (or antenna port) have a same spatial characteristic and may be received by using a same receive beam. For example, the indication information may be downlink control information (DCI). A beam may be represented in a protocol by identification of various signals, for example, a resource index of a channel state information reference signal (CSI-RS), an index of a synchronous signal/physical broadcast channel block (SS/PBCH block or SSB for short), a resource index of a sounding reference signal (SRS), and a resource index of a tracking reference signal (TRS). The base station may obtain an estimated beam for initiating paging at time (K+N) through a resource index, and may transmit downlink data to the UE through QCL by using one or more resources indicated in a search space.

Figure 10:
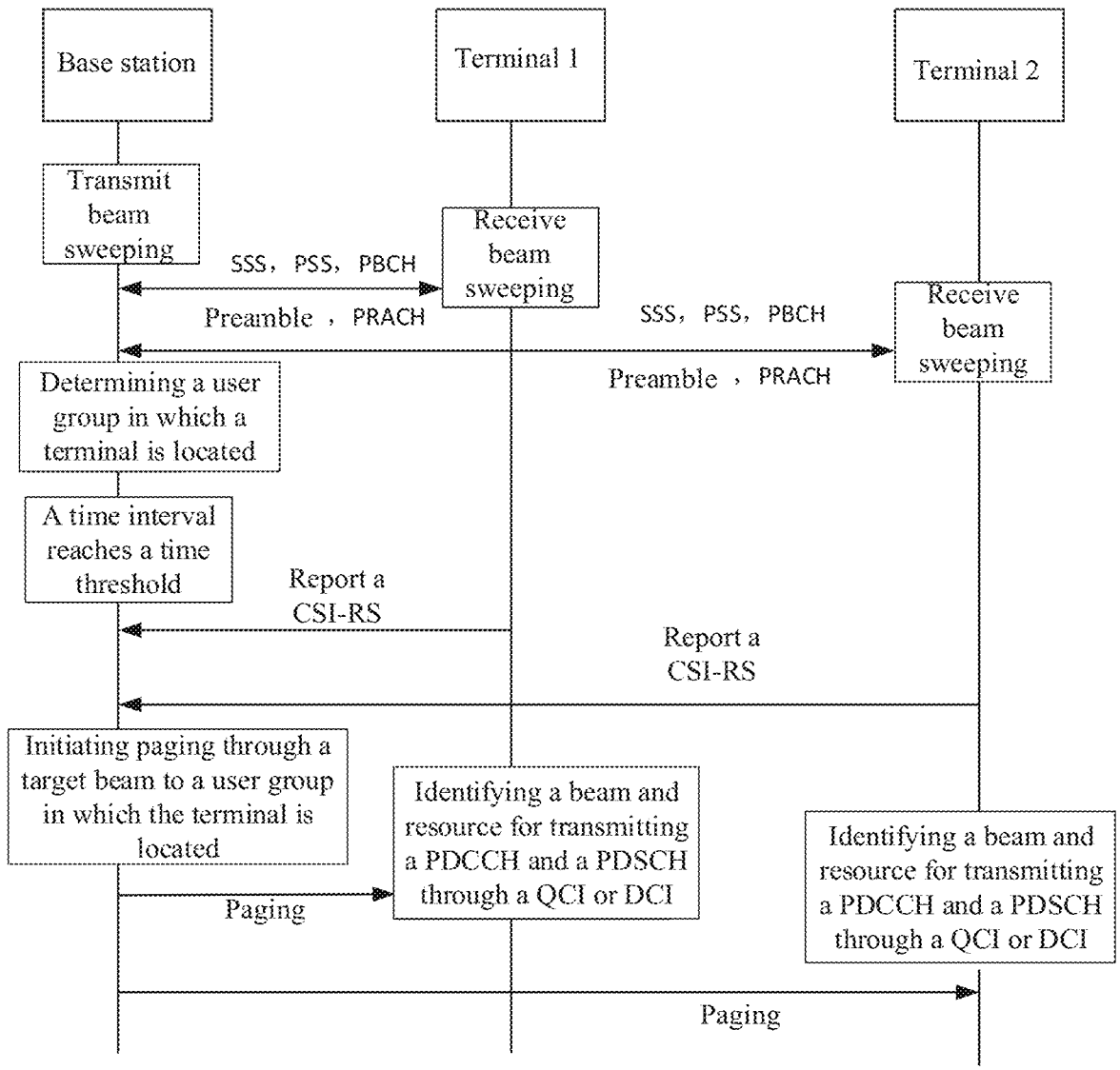
FIG. 10 is a schematic diagram of a scenario of interaction between a base station and a terminal according to an embodiment of the present application.

For a better explanation of the embodiment of the present application, refer to the schematic diagram of a scenario of interaction between a base station and a terminal shown in FIG. 10. The base station periodically performs beam sweeping according to a downlink sweeping period to transmit a synchronization signal including a primary synchronization signal (PSS), a secondary synchronization signal (SSS), a broadcast channel (PBCH), and the like, and sends the PSS, the SSS, and the PBCH together as the synchronization signal. After reading and demodulating the synchronization signal through beam sweeping, a terminal 1 and a terminal 2 send a preamble to the base station on an initially selected beam, and the preamble is sent through a configurable subset of physical random access channel (PRACH) slots to complete a random access procedure. The base station determines a receive beam of a terminal by reading the preamble, so as to learn which beam management the terminal belongs to, and then determines a user group in which the terminal is located. The base station sets a time threshold, and triggers the terminal 1 and the terminal 2 to report a CSI-RS when a time interval reaches the time threshold. According to a reporting result, the base station re-estimates the strongest beams respectively corresponding to the terminal 1 and the terminal 2 at time (K+N), and uses the strongest beams as target beams corresponding to the terminal 1 and the terminal 2, respectively, and then determines user groups in which the terminal 1 and the terminal 2 are respectively located. The base station initiates paging on the determined target beams to the user groups in which the terminal 1 and the terminal 2 are located, respectively, and identifies beams and resources for transmitting a physical downlink control channel (PDCCH) and a physical downlink shared channel (PDSCH) through a QoS class identifier (QCI) or downlink control information (DCI), so as to ensure subsequent smooth transmission. For example, the time threshold may be at least one of the following: an SSB; a period of an SS Burst set; and a multiple of the period of the SS Burst set.

For a user group, determination and subscription of the user group in which a UE is located are based on a beam determined by the user group and a condition that corresponding time threshold is reached. That is, the determination of the user group is determined based on a result of CSI-RS measurement, and management of the user group is re-determined when the interval time reaches or exceeds a time threshold set by a system. According to the method provided in the embodiment of the present application, regardless of whether a user moves or not, a base station may predict a user group in which a terminal is located and a transmit beam associated with the user group at a time that paging needs to be sent.

Figure 11:
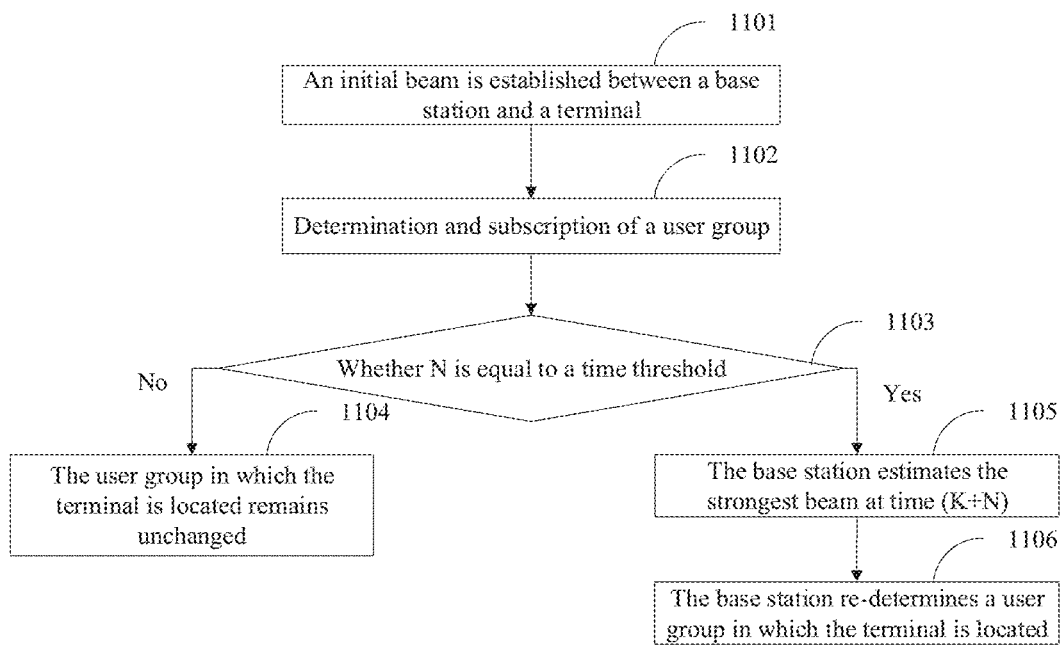
FIG. 11 is yet another schematic flowchart of a wireless communication method according to an embodiment of the present application.

For example, as shown in FIG. 11, for determination of a user group, in Step 1101, when a base station and a UE are connected to establish an initial beam procedure, the base station sends a plurality of SSBs. These SSBs are transmitted in turn and each SSB is carried on a different downlink beam. On the one hand, the SSBs are associated with downlink beams; and on the other hand, the SSBs are also associated with resources such as an uplink random access opportunity and a preamble. In this way, the base station may learn, through random access, a downlink beam selected by a terminal. Since a beam can only point to one direction at a specific time, downlink data transmitted to terminals that are in different directions needs to be arranged at different times for transmission, respectively, and a receive beam can perform receiving only in one direction at a specific time, so that an initial beam pair is established between the base station and the terminal. In Step 1102, according to the downlink beam determined by the terminal, that is, the terminal is assigned to management of the beam and subscribed to a user group of the beam, becoming a member of the user group. In Step 1103, it is determined whether an interval time N is equal to a time threshold. If not, Step 1104 is performed; if yes, Step 1105 is performed. In Step 1104, if N is not equal to the time threshold, the base station considers by default that the beam sent to the terminal remains unchanged, and the user group in which the terminal is located also remains unchanged. In Step 1105, when N is equal to the time threshold, the base station re-estimates the strongest beam received by a UE of each terminal at time (K+N) according to the method proposed in the embodiment of the present application. In Step 1106, the base station re-determines a user group in which each terminal is located based on an estimation result. In this embodiment, the time threshold may be a period of an SS burst set or a multiple of the period of the SS burst set. When an interval time N from establishment of the initial beam to a current time is equal to the period of the SS burst set or the multiple of the period of the SS burst set, the strongest beam received by a UE of each terminal at time (K+N) needs to be re-estimated. When the interval time N from establishment of the initial beam to a current time is not equal to the period of the SS burst se or not equal to the multiple of the period of the SS burst set, the beam transmitted to the terminal remains unchanged by default.

All the foregoing technical solutions may be randomly combined to form optional embodiments of the present application. Details are not described herein.

According to the embodiment of the present application, a base station performs user grouping management on all terminals in a target cell, periodically updates user groups for all terminals in the target cell; and initiates, based on the user groups, paging of different groups. In the embodiments of the present application, paging grouping management is performed for all users in a cell managed by the base station, where each beam manages one user group; user groups is periodically updated for all terminals in the target cell; and then paging of different groups is initiated based on the user groups. Same paging is initiated only to a user group that is corresponding to a target beam, not to a user group managed by another beam. Therefore, paging time may be shortened, energy consumption may be reduced, and costs may be saved. Specifically, when an interval time reaches a time threshold, the strongest beam corresponding to each terminal in a target cell at time (K+N) may be re-predicted as an estimated beam based on CSI reports reported by all terminals, and an estimated user group in which each terminal is located may be predicted. When initiating paging to a target terminal, the base station determines, based on the estimated beam and the estimated user group, a target beam of a UE of a target terminal to be paged at time (K+N) and a target user group in which the target terminal is located, and paging is initiated only to a target user group managed by the target beam corresponding to the target terminal, not to a user managed by another beam. Therefore, paging time may be shortened, energy consumption may be reduced, and costs may be saved.

Figure 12:
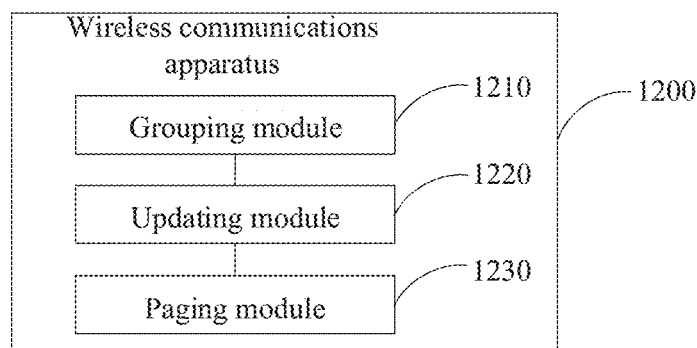
FIG. 12 is a schematic structural diagram of a wireless communications apparatus according to an embodiment of the present application.

In order to better implement the wireless communication method of the embodiment of the present application, an embodiment of the present application further provides a wireless communications apparatus. Referring to FIG. 12, FIG. 12 is a schematic structural diagram of a wireless communications apparatus according to an embodiment of the present application. The wireless communications apparatus 1200 includes:

a grouping module 1210, configured to perform user grouping management on all terminals in a target cell;

an updating module 1220, configured to periodically update user groups for all terminals in the target cell; and a paging module 1230, configured to initiate, based on the user groups, paging of different groups.

In some embodiments, the grouping module 1210 may be configured to: when initial beams are established between a base station and all terminals in the target cell, determine, based on an initial beam corresponding to each terminal in the target cell, an initial user group in which each terminal in the target cell is located.

In some embodiments, the updating module 1220 further includes:

a receiving unit, configured to: when an interval time N reaches a time threshold, receive channel state information CSI reports reported by all terminals in the target cell;

a prediction unit, configured to predict, based on the CSI report, an estimated beam corresponding to each terminal in the target cell at time (K+N); and a first determining unit, configured to determine, based on the estimated beam, an estimated user group in which each terminal is located.

In some embodiments, the CSI report includes CSI reference signals of M beams corresponding to each terminal in the target cell, a layer 1 reference signal received power L1-RSRP of the strongest beam determined by each terminal in the target cell, and a difference between a reference signal received power of a remaining (M-1) beam and the L1-RSRP of the strongest beam of each terminal in the target cell.

The prediction unit may be configured to: determine, based on the CSI report, RSRP values of the M beams corresponding to each terminal in the target cell at time K and time (K-1); calculate, based on the RSRP values of the M beams corresponding to each terminal in the target cell at time K and time (K-1), RSRP values of the M beams corresponding to each terminal in the target cell at time (K+N); and determine a beam corresponding to a maximum value of the RSRP values of the M beams corresponding to each terminal in the target cell at time (K+N) as an estimated beam corresponding to each terminal in the target cell at time (K+N).

In some embodiments, the first determining unit may be configured to determine a user group managed by the estimated beam corresponding to each terminal in the target cell at time (K+N) as an estimated user group in which each terminal in the target cell is located at time (K+N).

In some embodiments, after determining, based on the CSI report, RSRP values of the M beams corresponding to each terminal in the target cell at time K and time (K-1), the prediction unit may further be configured to: store the RSRP values of the M beams corresponding to each terminal in the target cell at time K and time (K-1) in a register. The calculating, based on the RSRP values of the M beams corresponding to each terminal in the target cell at time K and time (K-1), RSRP values of the M beams corresponding to each terminal in the target cell at time (K+N) includes: calculating, based on the RSRP values of the M beams corresponding to each terminal in the target cell at time K and time (K-1) stored in the register, the RSRP values of the M beams corresponding to each terminal in the target cell at time (K+N), where the time K and time (K-1) are two times, in all times stored in the register, closest to the time (K+N).

In some embodiments, when calculating, based on the RSRP values of the M beams corresponding to each terminal in the target cell at time K and time (K-1), the RSRP values of the M beams corresponding to each terminal in the target cell at time (K+N), the prediction unit may be configured to: calculate a difference between an RSRP value of an $i^{th}$ beam corresponding to each terminal in the target cell at time K and an RSRP value of the $i^{th}$ beam at time (K-1); multiply the interval time N by the difference to obtain a first calculation result; determine, based on a sum of the RSRP value of the $i^{th}$ beam at time K and the first calculation result, an RSRP value of the $i^{th}$ beam corresponding to each terminal in the target cell at time (K+N); and determine, based on the RSRP value of the $i^{th}$ beam corresponding to each terminal in the target cell at time (K+N), the RSRP values of the M beams corresponding to each terminal in the target cell at time (K+N), where i=0, 1, 2, . . . , M-1.

In some embodiments, the receiving unit may be configured to: when the interval time reaches a time threshold, receive the CSI reports reported by all terminals in the target cell based on a first reporting instruction, where the first reporting instruction is an instruction sent by the base station to each terminal in the target cell during establishment of initial beams between the base station and all terminals in the target cell, and the first reporting instruction is used to instruct each terminal in the target cell to automatically report the CSI report when the interval time reaches the time threshold; or when the interval time reaches a time threshold, send a second reporting instruction to all terminals in the target cell, and receive the CSI reports reported by all terminals in the target cell based on the second reporting instruction.

In some embodiments, the paging module 1230 may be configured to send, via the estimated beam corresponding to each terminal, paging information to the estimated user group in which each terminal is located, to initiate paging of different groups.

In some embodiments, the paging module 1230 further includes:

a second determining unit, configured to: when the base station initiates paging to the target terminal, determine, based on the estimated beam corresponding to each terminal in the target cell at time (K+N) and the estimated user group in which each terminal is located, a target beam corresponding to the target terminal at time (K+N) and a target user group in which the target terminal is located, where the target terminal is a terminal that needs to be paged, and the target terminal is located in the target cell; and a paging unit, configured to send paging information to the target user group through the target beam to page the target terminal.

In some embodiments, the second determining unit may be configured to: when receiving a paging message transmitted by a 5G core network, determine, based on a target UE identity, carried in the paging message, of a target terminal that needs to be paged, a terminal corresponding to the target UE identity in all terminals in the target cell as the target terminal; and determine, based on an estimated beam corresponding to the determined target terminal at time (K+N), the target beam corresponding to the target terminal at time (K+N), and determine, based on an estimated user group in which the determined target terminal is located at time (K+N), a target user group in which the target terminal is located.

In some embodiments, the paging unit may be configured to send the paging information through the target beam to all terminals belonging to the target user group to page the target terminal, where the target terminal belongs to the target user group.

In some embodiments, the paging unit is further configured to: when the interval time N does not reach the time threshold, send paging information to an initial user group corresponding to the target terminal through an initial beam corresponding to the target terminal to page the target terminal.

In some embodiments, the time threshold includes at least one of the following: a time-frequency resource SSB, a period of an SS burst set; and a multiple of the period of the SS burst set.

All of the foregoing technical solutions may be randomly combined to form optional embodiments of the present application. Details are not described herein.

It should be understood that the apparatus embodiments may correspond to the method embodiments, and for similar descriptions, reference may be made to the method embodiments. To avoid repetition, details are not described herein. Specifically, the apparatus shown in FIG. 12 may perform the foregoing wireless communication method embodiments, and the foregoing and other operations and/or functions of each unit in the apparatus respectively implement the corresponding processes of the method embodiments. For brevity, details are not described herein.

Figure 13:
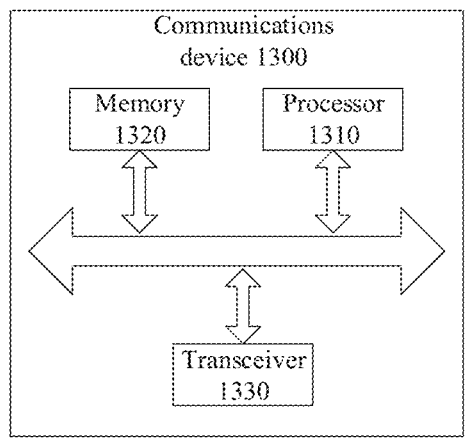
FIG. 13 is a schematic structural diagram of a communications device according to an embodiment of the present application.

FIG. 13 is a schematic structural diagram of a communications device according to an embodiment of the present application. The communications device 1300 shown in FIG. 13 includes a processor 1310, and the processor 1310 may call and run a computer program from a memory to implement the method in an embodiment of the present application.

In some embodiments, as shown in FIG. 13, the communications device 1300 may further include a memory 1320. The processor 1310 may call and run a computer program from the memory 1320 to implement the method in an embodiment of the present application.

The memory 1320 may be a separate device independent of the processor 1310, or may be integrated in the processor 1310.

In some embodiments, as shown in FIG. 13, the communications device 1300 may further include a transceiver 1330. The processor 1310 may control the transceiver 1330 to communicate with another device, specifically, may transmit information or data to the another device or receive information or data transmitted by the another device.

The transceiver 1330 may include a transmitter and a receiver. The transceiver 1330 may further include an antenna, and a quantity of antennas may be one or more.

In some embodiments, the communications device 1300 may be specifically the network device according to an embodiment of the present application, and the communications device 1300 may implement corresponding processes implemented by the network device (such as a base station) in various methods according to the embodiments of the present application. For brevity, details are not described herein.

Figure 14:
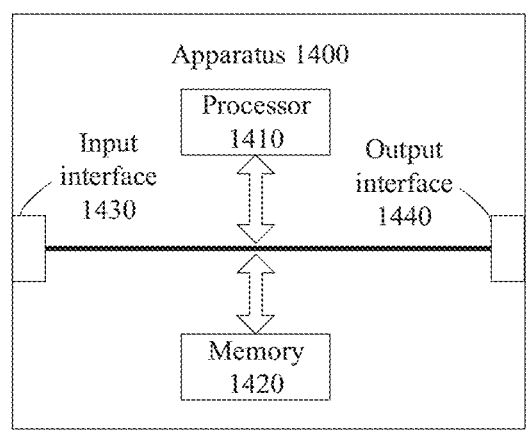
FIG. 14 is a schematic structural diagram of an apparatus according to an embodiment of the present application.

FIG. 14 is a schematic structural diagram of an apparatus according to an embodiment of the present application. The apparatus 1400 shown in FIG. 14 includes a processor 1410, and the processor 1410 may call and run a computer program from a memory to implement the method in an embodiment of the present application.

In some embodiments, as shown in FIG. 14, the apparatus 1400 may further include a memory 1420. The processor 1410 may call and run a computer program from the memory 1420 to implement the method in an embodiment of the present application.

The memory 1420 may be a separate device independent of the processor 1410, or may be integrated in the processor 1410.

In some embodiments, the apparatus 1400 may further include an input interface 1430. The processor 1410 may control the input interface 1430 to communicate with another device or chip, and specifically, may obtain information or data transmitted by the another device or chip.

In some embodiments, the apparatus 1400 may further include an output interface 1440. The processor 1410 may control the output interface 1440 to communicate with another device or chip, and specifically, may output information or data to the another device or chip. In some embodiments, the apparatus may be applied to the network device in the embodiments of the present application, and the apparatus may implement the corresponding processes implemented by the network device in various methods of the embodiments of the present application. For brevity, details are not described herein. In some embodiments, the apparatus referred to in the embodiment of the present application may alternatively be a chip. For example, the chip may be a system-level chip, a system chip, a chip system, a system-on-chip, or the like.

It should be understood that, a processor in the embodiment of the present application may be an integrated circuit chip having a signal processing capability. In an implementation process, the steps in the foregoing method embodiments may be performed by using an integrated logic circuit of hardware of the processor or instructions in a software form. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present application. The general-purpose processor may be a microprocessor, or the processor may be any conventional processor or the like. Steps of the methods disclosed with reference to the embodiments of the present application may be directly performed and accomplished through a hardware decoding processor, or may be performed and accomplished by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information from the memory, and performs the steps of the foregoing methods in combination with hardware of the processor.

It may be understood that the memory in the embodiment of the present application may be a volatile memory or a nonvolatile memory, or may include both a volatile memory and a nonvolatile memory. The nonvolatile memory may be a read-only memory (ROW a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memoy (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and methods described in this specification includes but is not limited to these and any memory of another proper type.

It should be understood that, by way of example but not limitative description, for example, the memory in the embodiment of the present application may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. In other words, the memory in the embodiment of the present application includes but is not limited to these and any memory of another proper type.

An embodiment of the present application further provides a computer-readable storage medium for storing a computer program.

In some embodiments, the computer-readable storage medium may be applied to the network device or the base station in the embodiments of the present application, and the computer program causes a computer to perform the corresponding processes implemented by the network device or the base station in various methods in the embodiments of the present application. For brevity, details are not described herein.

An embodiment of the present application further provides a computer program product including computer program instructions.

In some embodiments, the computer program product may be applied to the network device or the base station in the embodiments of the present application, and the computer program instructions cause a computer to perform the corresponding processes implemented by the network device or the base station in various methods in the embodiments of the present application. For brevity, details are not described herein.

An embodiment of the present application further provides a computer program.

In some embodiments, the computer program may be applied to the network device or the base station in the embodiments of the present application, and when the computer program is run on a computer, the computer is enabled to perform the corresponding processes implemented by the network device or the base station in various methods in the embodiments of the present application. For brevity, details are not described herein.

A person of ordinary skill in the art may be aware that, units and algorithm steps in examples described in combination with the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that, the disclosed system, apparatus, and method may be implemented in other manners. For example, the described apparatus embodiments are merely examples. For example, the unit division or module division is merely logical function division and may be other division in actual implementation. For example, a plurality of units, modules, or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units or modules described as separate components may be or may not be physically separated, and the components displayed as units or modules may be or may not be physical units, that is, may be located in one place or distributed on a plurality of network units. Some or all of the units or modules may be selected according to an actual need to achieve the objectives of the solutions of the embodiments.

In addition, the functional units or modules in the embodiments of the present application may be integrated into one processing unit or module, or each of the units or modules may exist alone physically, or two or more units may be integrated into one unit, or two or more modules may be integrated into one module.

When the functions are implemented in a form of a software function unit or module and sold or used as an independent product, the functions may be stored in a computer-readable storage medium. For such understanding, the essence of the technical solutions of the present application or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of the present application. The foregoing storage medium includes various media that may store a program code, such as a USB flash drive, a mobile hard disk, a Read-only Memory (ROM), a Random Access Memory (RAM), a magnetic disk, or an optical disk.

The foregoing descriptions are only specific implementations of the present application, but the protection scope of the present application is not limited thereto. Any modifications or replacements easily conceived by those skilled in the art within the disclosed technical scope of the present application shall fall within the protection scope of the present application. Therefore, the protection scope of the present application should be subject to the protection scope of the claims.

What is claimed is:

1. A wireless communication method, applied to a base station, wherein the method comprises:
performing user grouping management on a plurality of terminals in a target cell;

periodically updating user groups for the plurality of terminals in the target cell, wherein the periodically updating comprises:
  receiving, at a first time, a channel state information (CSI) report from a terminal in the target cell, wherein the CSI report comprises CSI reference signals of M beams corresponding to the terminal in the target cell, a layer 1 reference signal received power (L1-RSRP) of a strongest beam corresponding to the terminal in the target cell, and a difference between a reference signal received power (RSRP) of a remaining beam corresponding to the terminal and the L1-RSRP of the strongest beam corresponding to the terminal in the target cell, wherein M is a positive integer greater than 1;
  predicting, based on the CSI report, an estimated beam corresponding to the terminal in the target cell to be transmitted at a second time, wherein the second time is after the first time, and wherein the predicting the estimated beam comprises:
    determining, based on the CSI report, RSRP values of the M beams corresponding to the terminal in the target cell at the first time and a previous time;
    calculating, based on the RSRP values of the M beams corresponding to the terminal in the target cell at the first time and the previous time, RSRP values of the M beams corresponding to the terminal in the target cell to be transmitted at the second time; and
    determining a beam corresponding to a maximum value of the RSRP values of the M beams corresponding to the terminal in the target cell at the second time as the estimated beam corresponding to the terminal in the target cell to be transmitted at the second time;
  determining, based on the estimated beam, an estimated user group for the terminal; and
  updating a user group for the terminal based on the estimated user group; and
performing, based on the updated user groups, paging of the terminal.

2. The wireless communication method according to claim 1, wherein the performing user grouping management on the plurality of terminals in a target cell comprises:
  determining, based on an initial beam corresponding to each of the plurality of terminals in the target cell, an initial user group in which each of the plurality of terminals in the target cell belongs.

3. The wireless communication method according to claim 1, wherein the determining, based on the estimated beam, the estimated user group for the terminal comprises:
  determining a user group managed by the estimated beam corresponding to the terminal in the target cell to be transmitted at the second time as the estimated user group for the terminal.

4. The wireless communication method according to claim 1, further comprising:
  after the determining, based on the CSI report, RSRP values of the M beams corresponding to the terminal in the target cell at the first time and the previous time:
    storing the RSRP values of the M beams corresponding to the terminal in the target cell at the first time and the previous time in a register; and
  wherein the calculating, based on the RSRP values of the M beams corresponding to the terminal in the target cell at the first time and the previous time, RSRP values of the M beams corresponding to the terminal in the target cell to be transmitted at the second time comprises:
    calculating, based on the RSRP values of the M beams corresponding to the terminal in the target cell at the first time and the previous time stored in the register, the RSRP values of the M beams corresponding to the terminal in the target cell to be transmitted at the second time, wherein the first time and the previous time are two times, among times stored in the register, that are closest to the second time.

5. The wireless communication method according to claim 1, wherein the performing, based on the updated user groups, paging of the terminal comprises:
  sending, via the estimated beam corresponding to the terminal, paging information to the updated user group for the terminal, to initiate paging.

6. The wireless communication method according to claim 1, wherein the second time corresponds to at least one of the following:
  a period of a synchronization signal block (SSB);
  a period of a synchronization signal burst set (SS burst set); or
  a multiple of the period of the SS burst set.

7. An apparatus, comprising:
  at least one processor;
  one or more non-transitory computer-readable storage media coupled to the at least one processor and storing programming instructions for execution by the at least one processor, wherein the programming instructions, when executed, cause the apparatus to perform operations comprising:
performing user grouping management on a plurality of terminals in a target cell;
periodically updating user groups for the plurality of terminals in the target cell, wherein the periodically updating comprises:
  receiving, at a first time, channel state information (CSI) reports from a terminal in the target cell, wherein the CSI report comprises CSI reference signals of M beams corresponding to the terminal in the target cell, a layer 1 reference signal received power (L1-RSRP) of a strongest beam corresponding to the terminal in the target cell, and a difference between a reference signal received power (RSRP) of a remaining beam corresponding to the terminal and the L1-RSRP of the strongest beam corresponding to the terminal in the target cell, wherein M is a positive integer greater than 1;
  predicting, based on the CSI report, an estimated beam corresponding to the terminal in the target cell to be transmitted at a second time, wherein the second time is after the first time, and wherein the predicting the estimated beam comprises:
    determining, based on the CSI report, RSRP values of the M beams corresponding to the terminal in the target cell at the first time and a previous time;
    calculating, based on the RSRP values of the M beams corresponding to the terminal in the target cell at the first time and the previous time, RSRP values of the M beams corresponding to the terminal in the target cell to be transmitted at the second time; and
    determining a beam corresponding to a maximum value of the RSRP values of the M beams corresponding to the terminal in the target cell at the second time as the estimated beam corresponding to the terminal in the target cell to be transmitted at the second time;
determining, based on the estimated beam, an estimated user group for the terminal; and
updating a user group for the terminal based on the estimated user group; and
performing, based on the updated user groups, paging of the terminal.

8. The apparatus according to claim 7, wherein the performing user grouping management on the plurality of terminals in a target cell comprises:
determining, based on an initial beam corresponding to each of the plurality of terminals in the target cell, an initial user group in which each of the plurality of terminals in the target cell belongs.

9. The apparatus according to claim 7, wherein the determining, based on the estimated beam, the estimated user group for the terminal comprises:
determining a user group managed by the estimated beam corresponding to the terminal in the target cell to be transmitted at the second time as the estimated user group for the terminal.

10. The apparatus according to claim 7, the operations further comprising:
after the determining, based on the CSI report, RSRP values of the M beams corresponding to the terminal in the target cell at the first time and the previous time:
storing the RSRP values of the M beams corresponding to the terminal in the target cell at the first time and the previous time in a register; and
wherein the calculating, based on the RSRP values of the M beams corresponding to the terminal in the target cell at the first time and the previous time, RSRP values of the M beams corresponding to the terminal in the target cell to be transmitted at the second time comprises:
calculating, based on the RSRP values of the M beams corresponding to the terminal in the target cell at the first time and the previous time stored in the register, the RSRP values of the M beams corresponding to the terminal in the target cell to be transmitted at the second time, wherein the first time and the previous time are two times, among times stored in the register, that are closest to the second time.

11. The apparatus according to claim 7, wherein the performing, based on the updated user groups, paging of the terminal comprises:
sending, via the estimated beam corresponding to the terminal, paging information to the updated user group for the terminal, to initiate paging.

12. The apparatus according to claim 7, wherein the second time corresponds to at least one of the following:
a period of a synchronization signal block (SSB);
a period of a synchronization signal burst set (SS burst set); or
a multiple of the period of the SS burst set.

13. The apparatus according to claim 7, wherein the apparatus is a network device.

14. One or more non-transitory computer-readable media storing computer instructions, that when executed by one or more processors, cause a computing device to perform operations comprising:
performing user grouping management on a plurality of terminals in a target cell;
periodically updating user groups for the plurality of terminals in the target cell, wherein the periodically updating comprises:
receiving, at a first time, channel state information (CSI) reports from a terminal in the target cell, wherein the CSI report comprises CSI reference signals of M beams corresponding to the terminal in the target cell, a layer 1 reference signal received power (L1-RSRP) of a strongest beam corresponding to the terminal in the target cell, and a difference between a reference signal received power (RSRP) of a remaining beam corresponding to the terminal and the L1-RSRP of the strongest beam corresponding to the terminal in the target cell, wherein M is a positive integer greater than 1;
predicting, based on the CSI report, an estimated beam corresponding to the terminal in the target cell to be transmitted at a second time, wherein the second time is after the first time, and wherein the predicting the estimated beam comprises:
determining, based on the CSI report, RSRP values of the M beams corresponding to the terminal in the target cell at the first time and a previous time;
calculating, based on the RSRP values of the M beams corresponding to the terminal in the target cell at the first time and the previous time, RSRP values of the M beams corresponding to the terminal in the target cell to be transmitted at the second time; and
determining a beam corresponding to a maximum value of the RSRP values of the M beams corresponding to the terminal in the target cell at the second time as the estimated beam corresponding to the terminal in the target cell to be transmitted at the second time;
determining, based on the estimated beam, an estimated user group for the terminal; and
updating a user group for the terminal based on the estimated user group; and
performing, based on the updated user groups, paging of the terminal.

15. The one or more non-transitory computer-readable media according to claim 14, wherein the performing user grouping management on the plurality of terminals in a target cell comprises:
determining, based on an initial beam corresponding to each of the plurality of terminals in the target cell, an initial user group in which each of the plurality of terminals in the target cell belongs.

16. The one or more non-transitory computer-readable media according to claim 14, wherein the determining, based on the estimated beam, the estimated user group for the terminal comprises:
determining a user group managed by the estimated beam corresponding to the terminal in the target cell to be transmitted at the second time as the estimated user group for the terminal.

17. The one or more non-transitory computer-readable media according to claim 14, the operations further comprising:
after the determining, based on the CSI report, RSRP values of the M beams corresponding to the terminal in the target cell at the first time and the previous time:
storing the RSRP values of the M beams corresponding to the terminal in the target cell at the first time and the previous time in a register; and
wherein the calculating, based on the RSRP values of the M beams corresponding to the terminal in the target cell at the first time and the previous time, RSRP values of the M beams corresponding to the terminal in the target cell to be transmitted at the second time comprises:

calculating, based on the RSRP values of the M beams corresponding to the terminal in the target cell at the first time and the previous time stored in the register, the RSRP values of the M beams corresponding to the terminal in the target cell to be transmitted at the second time, wherein the first time and the previous time are two times, among times stored in the register, that are closest to the second time.

18. The one or more non-transitory computer-readable media according to claim 14, wherein the performing, based on the updated user groups, paging of the terminal comprises:

sending, via the estimated beam corresponding to the terminal, paging information to the updated user group for the terminal, to initiate paging.

19. The one or more non-transitory computer-readable media according to claim 14, wherein the second time corresponds to at least one of the following:

a period of a synchronization signal block (SSB);
a period of a synchronization signal burst set (SS burst set); or
a multiple of the period of the SS burst set.

\* \* \* \* \*